United States Patent
Sinha et al.

(10) Patent No.: US 11,374,751 B2
(45) Date of Patent: Jun. 28, 2022

(54) PASSWORD BASED KEY DERIVATION FUNCTION FOR NTP

(71) Applicant: HUAWEI TECHNOLOGIES CO., LTD., Shenzhen (CN)

(72) Inventors: Ankit Kumar Sinha, Karnataka (IN); Anil Kumar Srirangapatna Nagesh, Karnataka (IN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 140 days.

(21) Appl. No.: 16/418,718

(22) Filed: May 21, 2019

(65) Prior Publication Data

US 2019/0273612 A1    Sep. 5, 2019

Related U.S. Application Data

(63) Continuation of application No. PCT/CN2017/112359, filed on Nov. 22, 2017.

(30) Foreign Application Priority Data

Nov. 26, 2016  (IN) .............................. 201641040426

(51) Int. Cl.
*H04L 29/06* (2006.01)
*H04L 9/12* (2006.01)
(Continued)

(52) U.S. Cl.
CPC .............. *H04L 9/12* (2013.01); *G06F 21/725* (2013.01); *H04L 9/0863* (2013.01); *H04L 9/14* (2013.01);
(Continued)

(58) Field of Classification Search
CPC ... H04L 9/12; H04L 9/14; H04L 63/06; H04L 63/068; G06F 21/64; G06F 21/725
See application file for complete search history.

(56) References Cited

U.S. PATENT DOCUMENTS

| 8,397,988 B1 | 3/2013 | Zuili |
| 2005/0022020 A1 | 1/2005 | Fremberg |
| (Continued) | | |

FOREIGN PATENT DOCUMENTS

| CN | 102316095 A | 1/2012 |
| CN | 103370688 A | 10/2013 |
| (Continued) | | |

OTHER PUBLICATIONS

Sibold PTB S Roettger Gogglee Inc K Teichel PTB D:"Network Time Security; draft-ietf-ntp-network-time-security-15.txt", IETF; Internet Society (ISOC) 4, (Sep. 22, 2016), pp. 1-39.
(Continued)

*Primary Examiner* — Dao Q Ho
(74) *Attorney, Agent, or Firm* — Womble Bond Dickinson (US) LLP

(57) ABSTRACT

Systems, methods and devices for adding key chain and key derivative functions (KDF) support for Network time protocol (NTP) authentication using password based key derivation functions-NTP (PBKDF-NTP) are disclosed. In one embodiment, a method includes generating time bound multiple short lived keys instead of long lived keys for NTP security which ensures that attacker will not get enough time to crack the key values. The usage of time bound multiple short lived keys instead of long lived keys for NTP security will ensure that attacker will not get enough time to crack the key values within key lifetime. Hence man-in-middle attack can be avoided in NTP.

18 Claims, 5 Drawing Sheets

(51) Int. Cl.
*H04L 9/08* (2006.01)
*H04L 9/32* (2006.01)
*H04L 9/40* (2022.01)
*H04L 9/14* (2006.01)
*G06F 21/72* (2013.01)
*H04L 69/28* (2022.01)
*H04J 3/06* (2006.01)

(52) U.S. Cl.
CPC .......... *H04L 9/3242* (2013.01); *H04L 9/3297* (2013.01); *H04L 63/061* (2013.01); *H04L 63/083* (2013.01); *H04L 63/0846* (2013.01); *H04L 69/28* (2013.01); *H04J 3/0635* (2013.01); *H04L 63/068* (2013.01)

(56) References Cited

U.S. PATENT DOCUMENTS

| | | | |
|---|---|---|---|
| 2006/0095553 A1* | 5/2006 | Ogawa | G06F 21/725 709/223 |
| 2007/0169181 A1* | 7/2007 | Roskind | H04L 9/3271 726/5 |
| 2011/0321145 A1 | 12/2011 | Shimotono | |
| 2012/0066500 A1 | 3/2012 | Ananthasubramanian et al. | |
| 2013/0124292 A1 | 5/2013 | Juthani | |
| 2014/0095887 A1 | 4/2014 | Nayshtut et al. | |
| 2015/0121069 A1* | 4/2015 | Akehurst-Ryan | H04L 9/3268 713/158 |
| 2015/0256332 A1 | 9/2015 | Raj et al. | |
| 2016/0043865 A1* | 2/2016 | Matsakis | H04L 63/12 713/168 |

FOREIGN PATENT DOCUMENTS

| | | |
|---|---|---|
| CN | 104657855 A | 5/2015 |
| CN | 105245305 A | 1/2016 |
| WO | 2014136665 A1 | 9/2014 |

OTHER PUBLICATIONS

David L. Mills, Network Time Protocol (Version 3) Specification, Implementation and Analysis. RFC1305, Mar. 1992, 120 pages.

D. Reilly et al., Network Time Protocol Best Current Practices draft-reilly-ntp-bcp-01. Mar. 9, 2016, 14 pages.

B. Haberman et al., Network Time Protocol Version 4: Autokey Specification. RFC5906, Jun. 2010, 58 pages.

* cited by examiner

| LI | VN | Mode | Strat | Poll | Prec |
|---|---|---|---|---|---|
| Root delay ||||||
| Root dispersion ||||||
| Reference ID ||||||
| Reference timestamp (64) ||||||
| Origin timestamp (64) ||||||
| Receive timestamp (64) ||||||
| Transmit timestamp (64) ||||||
| Extension field (optional) ||||||
| Extension field (optional) ||||||
| Key identifier ||||||
| Message digest (128) ||||||

FIGURE 1

PASSWORD BASED KEY DERIVATION FUNCTION FOR NTP

CROSS-REFERENCE TO RELATED APPLICATION

This application is a continuation of International Application No. PCT/CN2017/112359, filed on Nov. 22, 2017, which claims priority to India Patent Application NO. IN201641040426, filed on Nov. 26, 2016. The disclosures of the aforementioned applications are herein incorporated by reference in their entireties.

TECHNICAL FIELD

Embodiment of the present application described herein, in general, relate to time synchronization in communication networks and more particularly to adding key chain and key derivative functions (KDF) support for Network Time Protocol (NTP) authentication using password based key derivation functions-NTP (PBKDF-NTP).

BACKGROUND

Time is a fundamental building step for computing applications, and is heavily utilized by many cryptographic protocols. Weaknesses in the Internet's time-synchronization mechanism can be exploited to cause debilitating outages, snoop on encrypted communications. Network Time Protocol (NTP) is a networking protocol for clock synchronization between computer systems over packet-switched, variable-latency data networks. The time synchronization between client and server works as follows: a client sends a NTP message to a time server; the time server analyses the received NTP packet, substitutes the Internet Protocol (IP) addresses and a few other fields of the NTP packet to form a new packet; and then the time server sends the new packet back to the client.

However, the communications between the client (e.g. computers) and time (e.g. NTP) servers are rarely encrypted, making it possible for hackers to perform man-in-the-middle attacks by resetting clocks to times that are months or even years in the past. By doing this, the attacks can be used to snoop on encrypted traffic or to bypass important security measures such as Domain Name System Security Extensions (DNSSEC) specification preventing the tampering of domain name system records. The most troubling scenario involves bypassing Hypertext Transfer Protocol Secure (HTTPS) encryption by forcing a computer to accept an expired transport layer security certificate.

One of the key weaknesses making the attacks possible is the difficulty of ensuring computers to communicate only with legitimate NTP servers. Hence there is a strong need of authentication method which is reliable and robust enough to sustain modern day security requirements.

An Auto-key and symmetric key mechanism is present for securing the NTP servers. Internet Engineering Task Force (IETF) Request for Comments (RFC) 5906 describes the Autokey security model for authenticating servers to clients using the NTP and public key cryptography. Further, RFC 1305, "the Network Time Protocol (Version 3) Specification, Implementation and Analysis", specifies the formal structure and summarizes information useful for its implementation.

However, with current day deciphering method as discussed in the prior-art, it is very easy to crack. Whereas in the case of Autokey which is also designed to cryptographically verify that a client is connected to a valid NTP server is not supported by most of the time servers. Hence, per described in draft draft-reilly-ntp-bcp-01, use of Autokey is not advisable, because a common laptop computer could crack the security cookie used in the Autokey protocol in 30 minute' time. Thus, the strong need of authentication method which is reliable and robust enough to sustain modern day security requirements still remains unaddressed.

The above-described deficiencies of existing mechanisms for securing the NTP servers are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to password-based key derivation function (PBKDF) based short lived key for time synchronization, and the same are further described below in the detailed description. This summary is not intended to identify essential features of embodiments of the application nor is it intended for use in determining or limiting the scope of the embodiments of the application.

According to a first aspect, a system for time synchronization is provided. The system includes an electronic device and a server. The electronic device is configured to generate a time bound short lived key; and transmit a packet to the server, the packet contains the time bound short lived key. The server is configured to analyze the packet based on the time bound short lived key contained in the packet to authenticate the electronic device; and transmit, when the authentication is successful, a response packet to the electronic device to achieve the time synchronization.

According to a second aspect, a method for time synchronization is provided. according to the method, an electronic device transmits a packet to a server, wherein the packet contains a time bound short lived key; the server analyzes the packet based on the time bound short lived key contained in the packet to authenticate the electronic device; and when the authentication is successful, the server transmits a response packet to the electronic device to achieve the time synchronization.

According to a third aspect, an electronic device is provided. The electronic device includes a processor, and a memory coupled to the processor, the processor is configured to execute a plurality of modules in the memory. The plurality of modules includes a key generation module, a transmitting module and a receiving module. The key generation module is configured to generate a time bound short lived key. The transmitting module is configured to transmit a packet to a server, the packet contains the time bound short lived key. The receiving module is configured to receive a response packet from the server to achieve the time synchronization.

According to a fourth aspect, a method for time synchronization is provided. The method includes: generating a time bound short lived key based on a password using a Password-Based Key Derivation Function (PBKDF), wherein the time bound short lived key is obtained by hashing a password and a key, and the key comprises one or more of: a salt data, a server IP address, or an electronic device IP address, an originating time stamp, and a value indicating a number of iteration; transmitting one or more packet to one or more server, the packet contains the one or more time bound short lived key; and receiving, in response to transmitting, a response packet from the one or more server to achieve the time synchronization.

According to the method and device of the application, a PBKDF algorithm may be tailored to NTP and a stronger password may be provided.

The various options and embodiments referred to above in relation to the first implementation are also applicable in relation to the other implementations.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 1 illustrates an NTP packet format.

Figure 2:
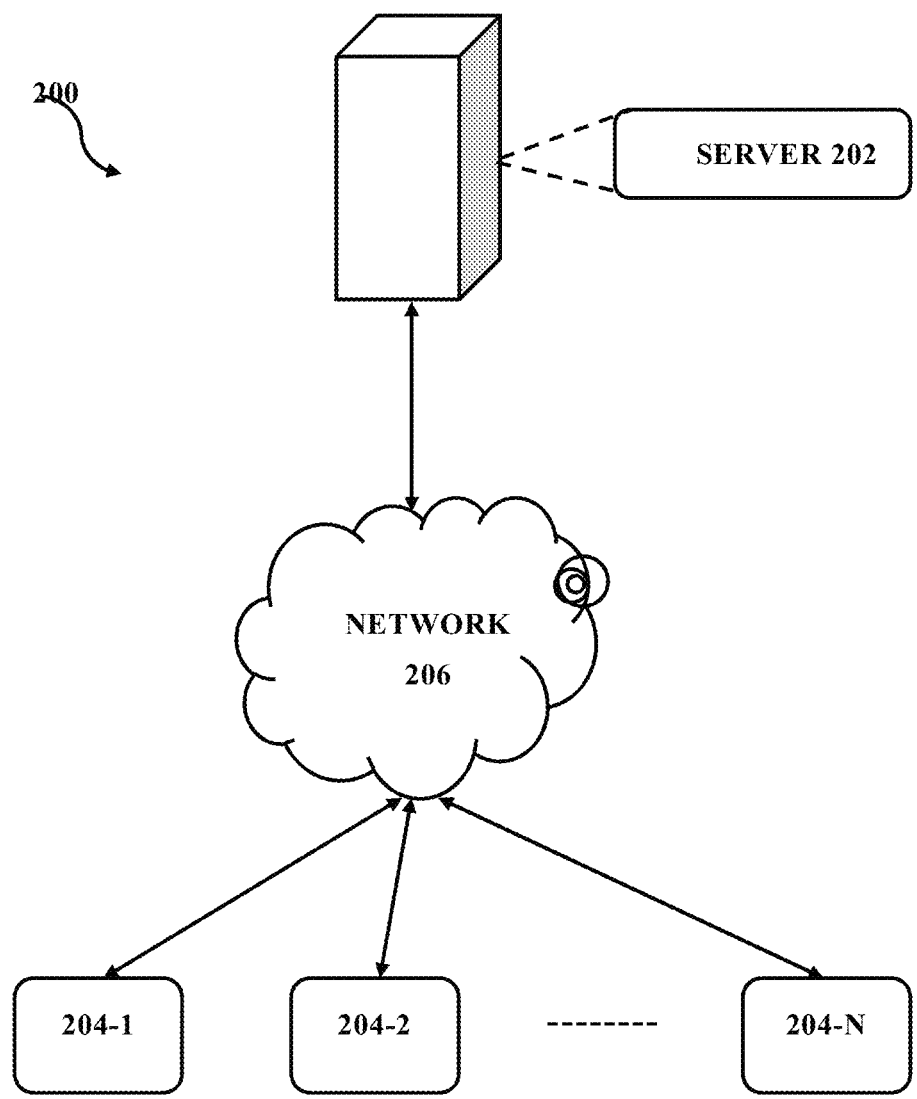
FIG. 2 illustrates a network implementation of a system for time synchronization, in accordance with an embodiment of the present application.

It is to be understood that the attached drawings are for purposes of illustrating the concepts of the application and may not be to scale.

DESCRIPTION OF EMBODIMENTS

Embodiments of the application can be implemented in numerous ways, as a process, an apparatus, a system, a composition of matter, a computer readable medium such as a computer readable storage medium or a computer network wherein program instructions are sent over an optical or an electronic communication link. In this specification, these implementations, or any other form that the application may take, may be referred to as techniques. In general, the order of the steps of disclosed processes may be altered within the scope of the application.

A detailed description of one or more embodiments of the application is provided below along with accompanying figures that illustrate the principles of the application. The application is described in connection with such embodiments, but the application is not limited to any embodiment. The scope of the application is limited only by the claims and the application encompasses numerous alternatives, modifications and equivalents. Numerous specific details are set forth in the following description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

In the following detailed description, numerous specific details are set forth in order to provide a thorough understanding of the application. However, it will be understood by those skilled in the art that the present application may be practiced without these specific details. In other instances, well-known methods, procedures, and components, modules, units and/or circuits have not been described in detail so as not to obscure the application.

Although embodiments of the application are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the application are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "a/an" may be replaced with "one or more" or "plurality" or "a plurality". Unless explicitly stated, the method embodiments described herein are not constrained to a particular order or sequence. Additionally, some of the described method embodiments or elements thereof can occur or be performed simultaneously, at the same point in time, or concurrently.

Throughout the specification, drawings, claims and abstract of the application, the expression "a server IP address" is identical with "an IP address of a server", the expression "an electronic device IP address" is identical with "an IP address of an electronic device".

Systems, methods and devices for adding key chain and key derivative functions (KDF) support for Network Time Protocol (NTP) authentication using password based key derivation functions-NTP (PBKDF-NTP) are disclosed.

While aspects are described for systems, methods and devices for adding key chain and key derivative functions (KDF) support for NTP authentication using password based key derivation functions-NTP (PBKDF-NTP), embodiments of the present application may be implemented in any number of different computing systems, environments, and/or configurations. The embodiments are described in the context of the following exemplary systems, devices/nodes/apparatus, and methods.

To meet the need of authentication method which is reliable and robust enough to sustain modern day security requirements, embodiments of the present application provide a system, method and device for generating time bound multiple short lived keys instead of long lived keys for NTP security. The system, method and device can prevent attackers from getting enough time to crack the key values.

Password Based Key Derivation Functions (PBKDFs) is part of RSA Laboratories' Public-Key Cryptography Standards (PKCS) series, specifically PKCS #5 v2.0, also published as Internet Engineering Task Force's RFC 2898. It replaces an earlier key derivation function, PBKDF1, which only produces derived keys up to 160 bits long. PBKDF2 applies a pseudorandom function, such as a cryptographic hash, cipher, or Keyed-Hashing for Message Authentication (HMAC), to the input password or passphrase along with a salt value and repeats the process many times to produce a derived key, which can then be used as a cryptographic key in subsequent operations. The added computational work makes password cracking much more difficult, and is known as key stretching.

PBKDFs are designed to be used with a password. Because the key space for passwords is much smaller than that of a randomly-generated byte string of the same length, the security is improved by "salting"—adding a random salt to prevent a dictionary attack—and "stretching", repeating the process several times to hinder brute force attacks. The user has to provide a random salt and an iteration count, typically of 1000 or more.

In one embodiment, the PBKDFs algorithm may be used for NTP version 4 onwards. Out of 32 bit key identifier field, first 16 bit will be used to accommodate a configured keyId and the rest 16 bit can be used to indicate the number of iteration(C) starting from 1-65536. Salt will be calculated as a hash of received packet origin timestamp and password.

FIG. 1 shows a format of a NTP packet header as specified in RFC 5905. When synchronizing between a client and a time server, the client sends a NTP message with a first time stamp to the time server, wherein the first timestamp is used to indicate a first time (e.g. T1) when the NTP message is sent. The time server analyses the NTP message and obtains the first timestamp, and sends a response message to the client, wherein the response message contains a second timestamp and a third timestamp, the second timestamp is used to indicate a second time (e.g. T2) when the time server receives the NTP message and the third timestamp is used to indicate a third time (e.g. T3) when the time server sends the response message. The client receives the response message sent from the time server and records a fourth time (e.g. T4) when the client receives the response message. Thus the client can obtains a time offset (e.g. θ) between the client and the time server based upon the function (1):

$$\theta = \frac{(T2 - T1) + (T3 - T4)}{2} \quad (1)$$

wherein the time server is assumed to be accurate.

In one embodiment of the present application, a PBKDF for adding key chain and key derivative functions (KDF) support for NTP authentication is provided. According to this embodiment, the short lived keys are generated using the password according to the following formulas.

During a packet communication with NTP utilizing a PBKDF the following inputs are considered:
P, password, a byte string;
S, salt, an 8-byte string;
Sip, server IP, that is, an IP address of a server;
Cip, client IP, that is, an IP address of a client;
Org, originate time stamp, "originate time stamp" is defined in RFC 5905 or RFC 1305;
C, a positive integer, indicating a number of iteration, which can be randomly generated but two consecutive packets send to a same server is different from each other, 2<=C<=65535.

According to the PBKDF-NTP algorithm:

$T1 = \text{Hash}(P\|S\|Org)$;

For $i=2$ to $C$ $Ti = \text{Hash}(P\|S\|Sip\|Cip\|Ti-1)$

Output is Ti, which will be carried in a NTP packet and sent to the electronic device or the server for authentication.

Wherein T1 is an intermediate value of the PBKDF-NTP algorithm, and final output of the algorithm is Ti at the end of iteration. Thus, it may be noted from the above that the conventional PBKDF is modified to suit with the NTP to obtain PBKDF-NTP according to the present application.

In one implementation, in the case of PBKDF-NTP for $T1 = \text{Hash}(P\|S\|Org)$, an originate timestamp (org) received from a NTP packet may be used by the server 202 and the client 204. Next time when the packet is exchanged between server 202 and the client 204, the originate timestamp will change. Due to the change in the originate timestamp, the value of T1 will be consistently changing, which will make it more difficult for an attacker to decode the NTP message, hence achieving more security. Once the T1 is calculated, the value T1 will be used in calculating Tn, where n is an integer number that is equal or bigger than 2.

In one implementation, in the case of $Ti = \text{Hash}(P\|S\|Sip\|Cip\|Ti-1)$, Sip and Cip are introduced as additional inputs to a hashing algorithm intended to generate unique keys specific to a client-server pair.

The technical benefit achieved because of using server ip (Sip) and client ip (Cip) as additional inputs to the hashing algorithm is that: Since hashing is done on more input, cracking this becomes more difficult. In any case of input collision, two client-server ip address pairs will not generate a same key; this provides an additional advantage over reply attack.

In one implementation, for state transitions of PBKDF-NTP according to the present application, the protocol state machine is simple but robust. An example of NTP client/server mode for explaining the operation is as provided below:

i. A NTP client may send a packet to a server; the sent packet includes a symmetric key authentication and a list of authentication algorithms, which is supported by NTP client. Strong algorithm may be used over week. For example, Authentication such as HMAC-256 will be optional over week algorithm like MD5. The packet may be an NTP packet and the list of authentication algorithm may be carried in an extension field of the NTP packet. Optionally, the list of authentication algorithm may be in the extension field of the NTP packet, in order of priority.

ii. Upon reception of the packet sent from the NTP client, the server may put an algorithm that the NTP server supports in an extension field of the packet and obtain a response packet; the server sent the response packet to the NTP client.

iii. Once the NTP client receives the response packet corresponding to the sent packet, the NTP client establishes an association between the NTP client and the server, by using any one of the algorithm supported by the NTP client and the server. Association may be understood as "an NTP association is formed when two peers exchange messages and one or both or more of them create and maintain an instantiation of the protocol machine.

iv. Once this association is destroyed or the server become unreachable, the NTP client may start again from step i.

v. Same procedure may be adopted for all other modes of the NTP.

Apart from the technical advancements as disclosed above, using time bound multiple short lived keys instead of long lived keys for NTP security can prevent that attacker from getting enough time to crack the key values within key lifetime. Hence man-in-middle attack can be avoided in NTP.

Referring again to FIG. 2, a network implementation of system 200 for time synchronization, in accordance with an embodiment of the present application, comprises one or more electronic device 204-1, 204-2 . . . 204-N, collectively referred to as "an electronic device 204" or "the electronic device 204" hereinafter, and one or more server 202, collectively referred to as "a server 202" or "the server 202" hereinafter.

Although the present application is explained considering that the present application is implemented as server 202, it may be understood that the server 202 may also be implemented in a variety of computing systems, such as a laptop computer, a desktop computer, a notebook, a workstation, a mainframe computer, a server, a network server, and the like. It will be understood that the server 202 may be accessed by multiple users through one or more user devices, or applications residing on the user devices. The electronic device 204 may be, but are not limited to, a portable computer, a personal digital assistant, a handheld device, or a workstation. The server 202 is communicatively coupled to the electronic device 204 through a network 206.

In one implementation, the network 206 may be a wireless network, a wired network or a combination thereof. The network 206 may be one of the different types of networks, such as an intranet, a local area network (LAN), a wide area network (WAN), the internet, and the like. The network 206 may either be a dedicated network or a shared network. The shared network represents an association of the different types of networks by using a variety of protocols, for example, Hypertext Transfer Protocol (HTTP), Transmission Control Protocol/Internet Protocol (TCP/IP), Wireless Application Protocol (WAP), and the like, to communicate with one another. Further the network 206 may include a variety of network devices. For example, the network 206 may include one or more of: one or more routers, one or more bridges, one or more servers, one or more computing devices, one or more storage devices, and the like.

In one embodiment, the system 200 for time synchronization includes the server 202 and the electronic device 204. The electronic device 204 is configured to generate a time bound short lived key; and transmit a packet to the server 204, the packet contains the generated time bound short lived key. The server 202 is configured to analyze the received packet based on the time bound short lived key contained in the received packet to authenticate the electronic device 204; and transmit, when the authentication is successful, a response packet to the electronic device 204 to achieve the time synchronization.

The embodiment utilizes a Password-Based Key Derivation Function (PBKDF) to generate the time bound short lived key, thereby complicating a task of an attacker to crack the time bound short lived key within a lifetime of the time bound short lived key, and decreasing the risk of that the packet is cracked when time synchronization.

In one implementation of the embodiment of the present application, the time bound short lived key is a dynamic key with changing or real-time values. The time bound short lived key is generated on real-time basis when the electronic device 204 transmits the packet to the server 202. The time bound short lived key is generated based on one password utilized for the packet communication between the electronic device 204 and the server 202. Optionally, the time bound short lived key is generated by hashing the password, the salt data, and the originating time stamp when the packet is sent from the electronic device 204 to the server 202 through the network 206.

In one implementation of the embodiment of the present application, the time bound short lived key is generated by hashing a password and a key. The key may include one or more of: a salt data, and an IP address of the server 202, and an IP address of the electronic device 204, and an originating time stamp, and a value indicating a number of iteration. This number of iteration is based on configuration; this is a crucial part of algorithm which should not be exposed as plain text in the packet.

In one implementation of the embodiment of the present application, the one or more time bound short lived key is generated by hashing the password, or the salt data, or the server IP address, or an electronic device IP address, or a value indicating a number of iteration.

Figure 3:
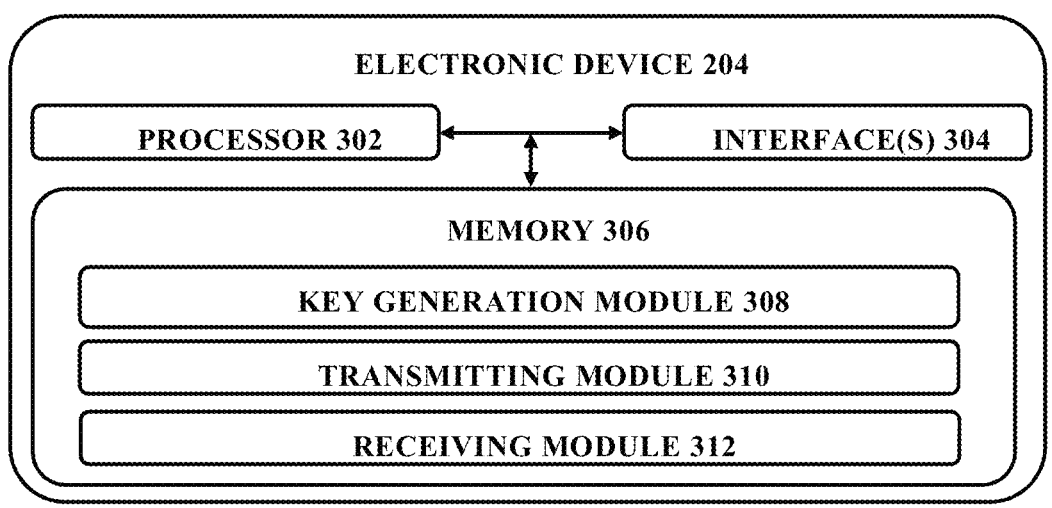
FIG. 3 illustrates an electronic device for time synchronization, in accordance with an embodiment of the present application.

Referring now to FIG. 3, an electronic device 204 is illustrated in accordance with an embodiment of the present application.

In one embodiment, the electronic device 204 comprises a memory 306 and a processor 302 communicating with the memory 306. The electronic device 204 may further include an I/O interface 304. The electronic device 204 may further include an intercommunication mechanism coupling the memory 306, the processor 302 and the communications interface 304. The processor 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute computer-readable instructions stored in the memory 306.

The I/O interface 304 may include a variety of interfaces, for example, a web interface, a graphical user interface, and the like. The I/O interface 304 may include software and/or hardware interface. The I/O interface 304 may allow the electronic device 204 to interact with a user directly. Further, the I/O interface 304 may enable the electronic device 204 to communicate with other computing devices, such as web servers and external data servers (not shown). The I/O interface 304 can facilitate multiple communications within a network, the network may be a wireless network or a wireless network. The wired network may be a LAN or a cable network. The wireless network may be a WLAN, or cellular network, or satellite network. The I/O interface 304 may include one or more ports for connecting a number of devices to one another or to another server.

The memory 306 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The memory 306 may include modules and data (not shown). Each of the modules includes one or more of a routine, a program, an object, a component and a data structure. Each of a routine, a program, an object, a component and a data structure performs a particular task or implement a particular abstract data type. In one embodiment, the memory 306 includes a key generation module 308, a transmitting module 310, and a receiving module 312.

The key generation module 308 is configured to generate a time bound short lived key. The time bound short lived key is a dynamic key with a changing or real-time value. The time bound short lived key is generated on real-time basis utilizing a Password-Based Key Derivation Function (PBKDF) to generate when the electronic device 204 transmits the packet to the server 202. The time bound short lived key is generated based on a password utilized for the packet communication between the electronic device 204 and the server 202.

In one implementation, the time bound short lived key is generated by hashing a password and a key. The key comprises one or more of: a salt data, a server IP address, an IP address of the electronic device 204, an originating time stamp and a value indicating a number of iteration. Optionally, the time bound short lived key is generated by hashing the password, the salt data, and the originating time stamp. Optionally, the time bound short lived key is obtained by generated the password, the salt data, an IP address of the server 202, an IP address of the electronic device 204, and a value indicating a number of iteration.

The transmitting module 310 is configured to transmit a packet to a server (e.g. server 202 as shown in FIG. 2), and the packet contains a time bound short lived key.

The receiving module 312 is configured to receive a response packet from the server (e.g. server 202 as shown in FIG. 2) to achieve the time synchronization. The response packet is received from the server (e.g. server 202 as shown in FIG. 2) when authentication of the electronic device is successful. The response packet is sent by the server (e.g. server 202 as shown in FIG. 2) in response to the transmitted packet by the transmitting module 310.

Figure 4:
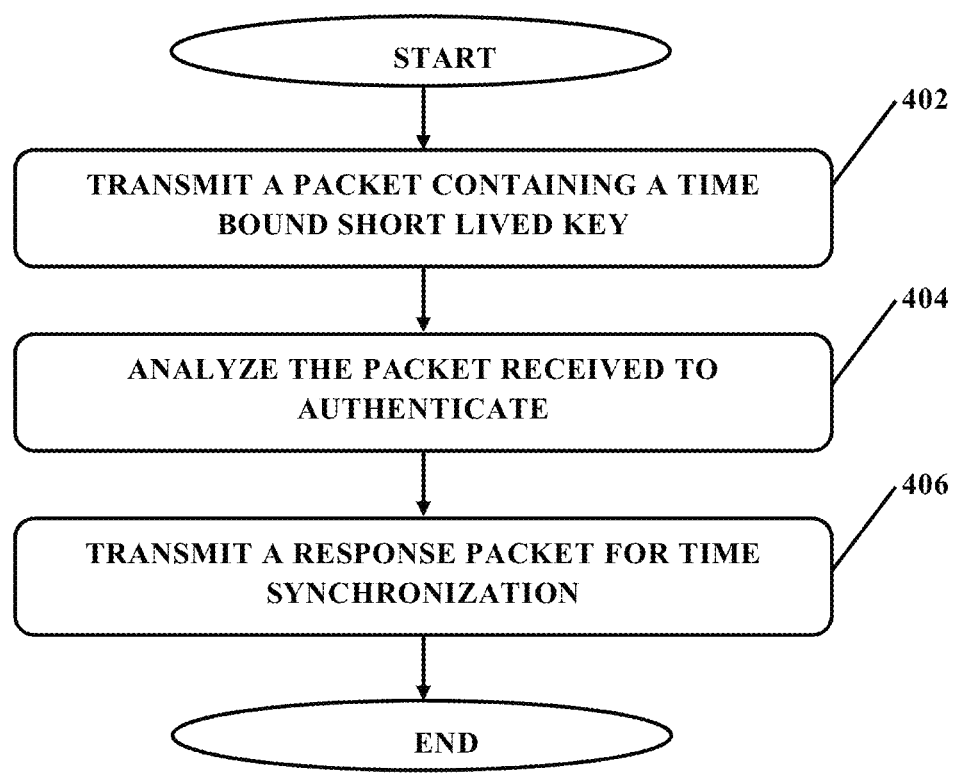
FIG. 4 illustrates a method for time synchronization, in accordance with an embodiment of the present application.
Figure 5:
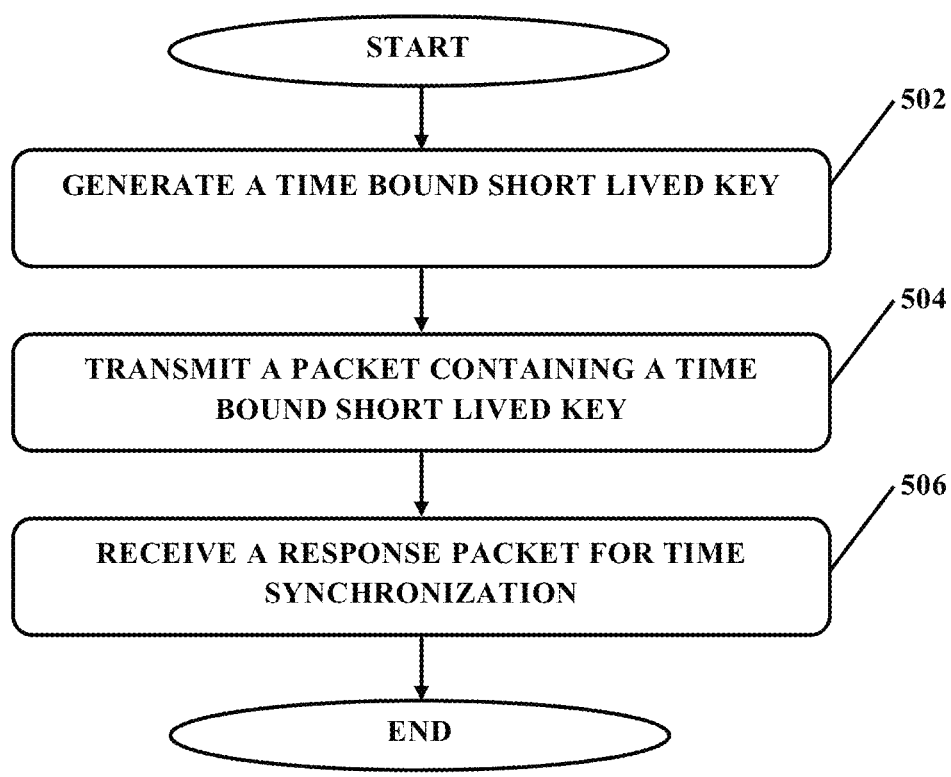
FIG. 5 illustrates a method performed by an electronic device for time synchronization, in accordance with an embodiment of the present application.

FIG. 4 illustrates a flowchart of a method for time synchronization is illustrated, in accordance with an embodiment of the present application. Referring to FIG. 5, a method for time synchronization performed by an electronic device is illustrated, in accordance with an embodiment of the present application. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method steps can be combined in any order to implement the method or alternate methods. Additionally, individual steps may be deleted from the method without departing from the protection scope of the application described herein. Furthermore, the method can be implemented in any suitable hardware, software, firmware, or combination thereof. However, for ease of explanation, in the embodiments described below, the method may be considered to be implemented in the above described electronic device 204 and/or the server 202.

According to FIG. 4, the method for time synchronization includes the following operations.

In operation 402, a packet generated by an electronic device (e.g. electronic device 204 as shown in FIG. 2 or 3) is transmitted to a server (e.g. server 202 as shown in FIG. 2), wherein the packet contains a time bound short lived key.

In one implementation, the time bound short lived key is a dynamic key with a changing or real-time value. The time bound short lived key is generated on real-time basis when the electronic device (e.g. electronic device 204 as shown in FIG. 2 or 3) transmits the packet to the server (e.g. server 202 as shown in FIG. 2). Optionally, the time bound short lived key is generated based on a password utilized for the packet communication between the electronic device (e.g. electronic device 204 as shown in FIG. 2 or 3) and the server (e.g. server 202 as shown in FIG. 2). Optionally, the time bound short lived key is generated by hashing a password and a key, and the key may include one or more of: a salt data, an IP address of a server, an IP address of an electronic device, an originating time stamp, and a value indicating a number of iteration. Optionally the time bound short lived key is generated by hashing a password, a salt data, and a originating time stamp. Optionally the time bound short lived key is generated by hashing a password, a salt data, an IP address of a server, an IP address of an electronic device, and a value indicating a number of iteration.

In operation 404, the server (e.g. server 202 as shown in FIG. 2) analyzes the packet at least based on the time bound short lived key contained in the packet to authenticate the electronic device (e.g. electronic device 204 as shown in FIG. 2 or 3).

In operation 406, when the authentication of the electronic device (e.g. electronic device 204 as shown in FIG. 2 or 3) is successful, the server (e.g. server 202 as shown in FIG. 2) transmits a response packet to the electronic device to achieve the time synchronization.

In one implementation, the method as explained above utilizes a Password-Based Key Derivation Function (PBKDF) to generate a time bound short lived key, thereby complicating a task of an attacker to crack the time bound short lived key within a lifetime of the time bound short lived key, and decreasing the risk of that the packet is cracked when time synchronization.

According to FIG. 5, the method for time synchronization performed by an electronic device (e.g. electronic device 204 as shown in FIG. 2 or 3) includes the following operations:

In operation 502, a time bound short lived keys are generated based on at least one password using a Password-Based Key Derivation Function (PBKDF), wherein the time bound short lived key is obtained by hashing a password and a key, and the key includes one or more of: a salt data, an IP address of a server (e.g. server 202 as shown in FIG. 2), or an IP address of an electronic device (e.g. electronic device 204 as shown in FIG. 2 or 3), an originating time stamp, and a value indicating a number of iteration.

In operation 504, the server transmits the packet to the server, where the packet contains the generated time bound short lived key.

In operation 506, in response to transmitting, the electronic device receives a response packet from the server received the transmitted packet and achieves the time synchronization. The response packet is sent from the server when the authentication of the electronic device is successful.

A person skilled in the art may understand that any known or new algorithms by be used for the implementation of the present application. However, it is to be noted that, the present application provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present application.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the application need not include the device itself.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A system for time synchronization, comprising
   an electronic device; and
   a time server;
   wherein the electronic device is to:
     generate, by one or more processors of the electronic device, a first key,
     transmit, by a transmitter of the electronic device, a packet to the time server, wherein the packet comprises the first key, wherein the first key is generated by utilizing a Password-Based Key Derivation Function (PBKDF), and the first key is generated by hashing a Password and a second key, wherein the second key comprising a first time stamp T1 and a value indicating a number of iteration performed to generate the first key, the T1 indicates a time when the electronic device transmits the packet comprising the first key to the time server;
   wherein the time server is configured to:
   analyze, by one or more processors of the time server, the packet based on the first key contained in the packet to authenticate the electronic device using the first key of the electronic device, and
   transmit, by a transmitter of the time server, when an authentication is successful, a response packet to the electronic device to achieve the time synchronization, wherein the response packet contains a second timestamp T2 and a third timestamp T3, the T2 indicates a time when the time server receives the packet comprising the first key, the T3 indicates a time when the time server transmits the response packet;
   wherein the electronic device is further to:
   receive the response packet transmitted from the time server;
   obtain a time offset θ between the electronic device and the time server based upon a function θ=(T2−T1)+(T3−T4)/2, wherein a fourth timestamp T4 indicates a time when the electronic device receives the response packet; and
   perform time synchronization based on the time offset θ between the electronic device and the time server.

2. The system of claim 1, wherein the first key is a dynamic key with a changing value or with a real-time value.

3. The system of claim 1, wherein the first key is generated on real-time basis when the electronic device transmits the packet to the time server.

4. The system of claim 1, wherein the first key is generated based on one password utilized for a packet communication between the electronic device and the time server.

5. The system of claim 1, where the second key further comprises one or more of: a salt data, an internet protocol (IP) address of the time server, or an IP address of the electronic device.

6. The system of claim 1, wherein the first key is carried in an extension field of the packet derived from a Network Time Protocol Password-Based Key Derivation Function (NTP-PBKDF).

7. An electronic device, comprising:
a non-transitory memory storage comprising instructions; and
one or more processors in communication with the non-transitory memory storage, wherein the one or more processors execute the instructions to cause the electronic device to:
generate a first key;
transmit a packet to a time server, the packet comprising the first key, wherein the first key is generated by utilizing a Password-Based Key Derivation Function (PBKDF), and the first key is generated by hashing a Password and a second key, wherein the second key comprising a first time stamp T1 and a value indicating a number of iteration performed to generate the first key, the T1 indicates a time when the electronic device transmits the packet comprising the first key to the time server;
receive a response packet from the time server to achieve time synchronization, wherein the response packet contains a second timestamp T2 and a third timestamp T3, the T2 indicates a time when the time server receives the packet comprising the first key, the T3 indicates a time when the time server transmits the response packet;
obtain a time offset θ between the electronic device and the time server based upon a function θ=(T2−T1)+(T3−T4)/2, wherein a fourth timestamp T4 indicates a time when the electronic device receives the response packet; and
perform time synchronization based on the time offset θ between the electronic device and the time server.

8. The electronic device of claim 7, wherein the first key is a dynamic key with a changing value or a real-time value.

9. The electronic device of claim 7, wherein the first key is generated on real-time basis utilizing the Password-Based Key Derivation Function (PBKDF) to generate when transmitting one or more packet to one or more time server.

10. The electronic device of claim 7, wherein the first key is generated based on at least one password utilized for a packet communication between the electronic device and the time server.

11. The electronic device of claim 7, wherein the second key further comprises one or more of: a salt data, a time server IP address, or an electronic device IP address.

12. The electronic device of claim 7, wherein the response packet is received from one or more time server when an authentication of the electronic device is successful.

13. The electronic device of claim 7, wherein the first key is carried as an identification value in an extension field of the packet derived from a Network Time Protocol Password-Based Key Derivation Function (NTP-PBKDF).

14. The system of claim 1, wherein the value is randomly generated to be greater than or equal to 2 and less than or equal to 65535.

15. The system of claim 1, wherein the packet comprises a Network Time Protocol (NTP) message and the NTP message includes a list of authentication algorithms supported by the electronic device.

16. The system of claim 1, wherein when the electronic device receives the response packet transmitted by the time server, the electronic device records the fourth time-stamp T4 indicating a time when a client receives the response packet.

17. The system of claim 1, wherein the electronic device is further configured to:
establish an association between the electronic device and the time server based on the response packet using one of a list of authentication algorithms supported by the electronic device.

18. A non-transitory memory storage comprising instructions, which when executed by a processor, causes the processor to:
generate a first key;
transmit a packet to a time server, the packet comprising the first key, wherein the first key is generated by utilizing a Password-Based Key Derivation Function (PBKDF), and the first key is generated by hashing a Password and a second key, wherein the second key comprising a first time stamp T1 and a value indicating a number of iteration performed to generate the first key, the T1 indicates a time when an electronic device transmits the packet comprising the first key to the time server;
receive a response packet from the time server to achieve time synchronization, wherein the response packet contains a second timestamp T2 and a third timestamp T3, the T2 indicates a time when the time server receives the packet comprising the first key, the T3 indicates a time when the time server transmits the response packet;
obtain a time offset θ between the electronic device and the time server based upon a function θ=(T2−T1)+(T3−T4)/2, wherein a fourth timestamp T4 indicates a time when the electronic device receives the response packet; and
perform time synchronization based on the time offset θ between the electronic device and the time server.

* * * * *